Figure 1:
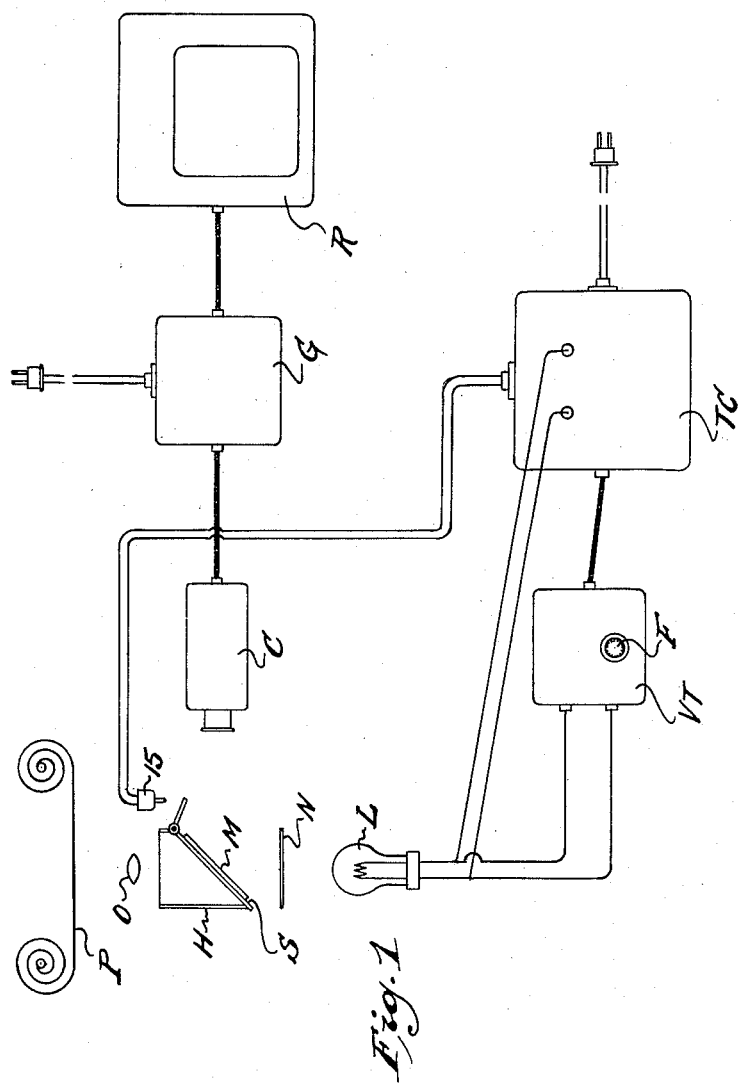

INVENTOR.
Albert Goodman,

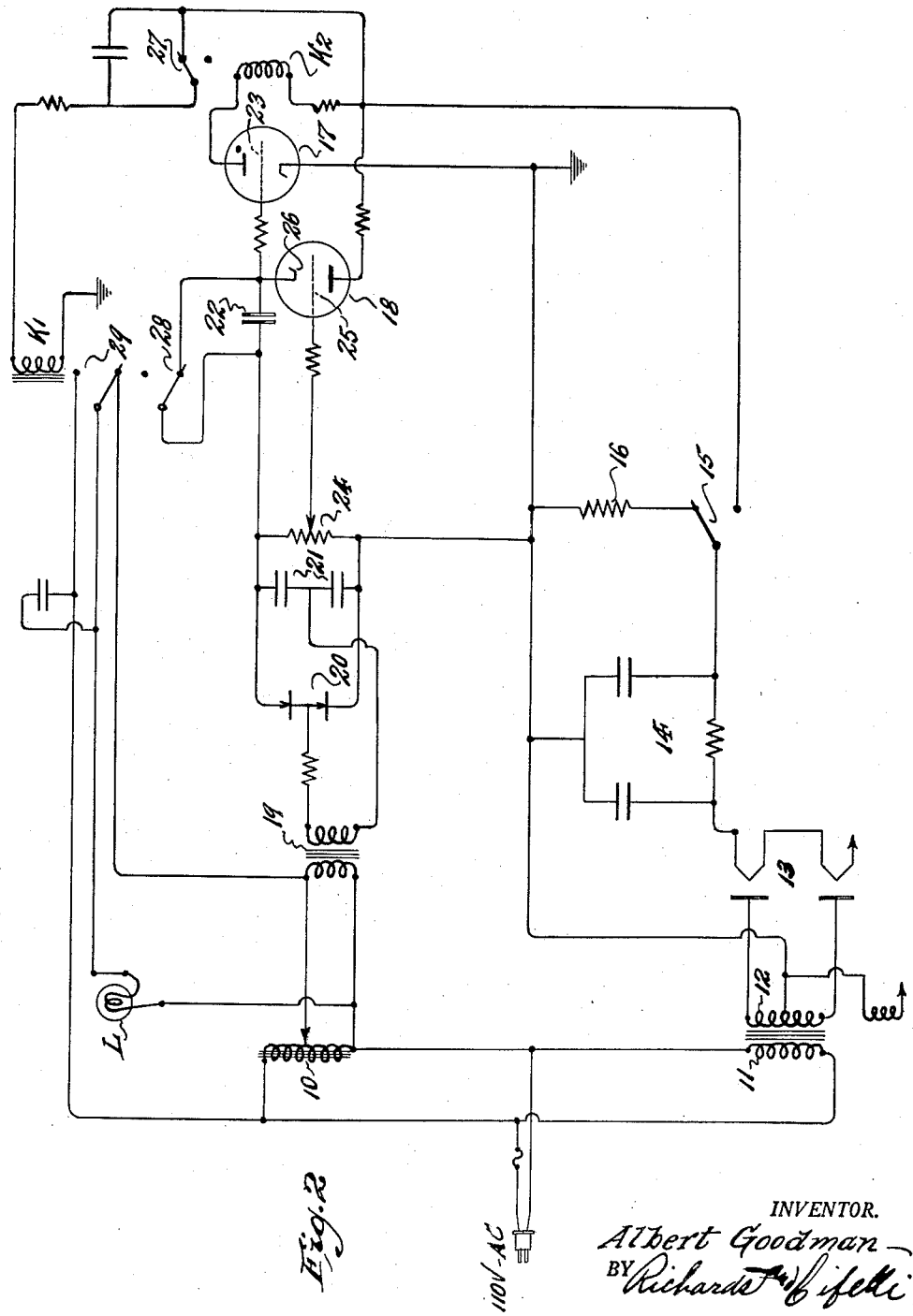

United States Patent Office 2,968,215
Patented Jan. 17, 1961

2,968,215

ELECTRONIC VIDEO EXPOSURE CONTROL SYSTEM FOR PHOTOGRAPHIC PRINTER

Albert Goodman, 1121 Liberty Ave., Union, N.J.

Filed Aug. 7, 1957, Ser. No. 676,803

8 Claims. (Cl. 88—24)

This invention relates to an automatic exposure control system for a photographic printer which includes means whereby the control system can be adjusted with reference to a preliminary video display and regulation of a positive picture derived from a negative thereof.

As heretofore known to the art, most automatic exposure control systems are based on the practice of directing all, or a portion, of light transmitted through the negative to be printed onto a phototube, the output of the latter being then compared with a preselected standard value and any difference between the two is used as the basis for altering the exposure so as to correct for the difference and thereby produce a thus adjudged good average print from the particular negative being measured. The exposure may in some instances be varied by keeping the time constant and varying the intensity of the printing light and in other instances by keeping the intensity of the light constant and varying the time of exposure. Such known exposure control systems require, in use, employment of highly skilled operator technique, since the operator must, by observation of the negative to be printed, judge the character or classification thereof, and, based on such preliminary judgment, must then select one of a plurality of compensating circuits of a phototube timer deemed by him most likely to produce a good average print. It will be obvious, under such conditions, that the operator has no way of knowing in advance what the final print will look like after development thereof. For this reason, much depends on the skill of the operator in initially judging the negative to be printed, and thereupon the operator's use of a selected compensating circuit of the phototube timer, which selection does not always obtain the full tone rendition capabilities of the negative and photographic material.

Having the above in view, it is an object of this invention to provide a novel exposure control system for a photographic printer which can be operated by an operator without special negative judging skill, or even by an amateur, with good assurance of obtaining the best possible print from a given negative. To this end, the exposure control system of this invention includes means to enable the operator to view a positive picture, derived from the negative, prior to the printing operation, and then to modify the displayed positive picture until it satisfies the eye that full rendition of the negative capabilities are availed of, such modification operating to automatically set the exposure control system for a printing operation which will obtain a corresponding full rendition of the negative capabilities with respect to the print produced therefrom.

This invention has for a further object to provide, in combination with a photographic printer, a closed circuit television system adapted to receive a picture from a negative to be printed, said system comprising a television camera to which the negative picture is transmitted by the light source of the photographic printer, and which in turn transmits said picture to a television receiver through a camera control unit and sync generator operative to reverse the picture from negative to positive, a variable transformer for varying the intensity of said light source, whereby to modify the positive picture of the television receiver, and an electronic time control means which predetermines duration of light transmission from the light source during the printing operation in accordance with the selected adjustment of the variable transformer.

The above and other objects will be understood from a reading of the following description of an illustrative embodiment of this invention in connection with the accompanying drawings, in which:

Fig. 1 is a schematic view of the exposure control system of this invention; and Fig. 2 is a circuit diagram of the electronic system including the time control which governs the printing operation of the light source of the photographic printer.

In Fig. 1 is schematically shown the automatic exposure control system of this invention as combined with a known type of photographic printer, such e.g. as an Eastman Kodak Rapid Printer Type IV, Pakomatic Printer Model 45, or the like, which includes automatic feed means for passing therethrough a suitable commercial photo-finishing grade of sensitized photographic paper P, characterized as having a relatively wide latitude. The negative N to be printed is illuminated by an incandescent lamp L as a light source, so that the image of the negative is projected by lens O onto the photographic paper P through a hood H of the printer. Pivotally connected with the hood H is a shutter S which, in hood closing position, is disposed at an angle of 45° across the beam of the lamp L, but, which in hood opening position, is dropped to vertical disposition, so as to permit the beam of the lamp L to pass through the hood to the photographic paper P with printing effect. Carried by the shutter S is a mirror M which, when the shutter is disposed in closed position, intercepts the negative image transmitting light beam, so as to direct the latter to a picture viewing means provided by what may be characterized as a video densitometer.

The video densitometer comprises a television camera C of the type which employs a highly sensitive camera pick up tube, such as a Vidicon 6198, and which will react or respond to the negative transmitted light with substantially the same sensitivity as does the photographic paper P above referred to. The negative image is transmitted by the camera C through a closed circuit to a standard video line monitor or television receiver R by way of a camera control unit and sync generator G, which functions to both amplify and invert the negative image to a positive or picture for display on the television receiver screen.

Cooperative with the video densitometer is a variable transformer VT of the type known as a Variac, and an electronic timer control TC which is adjusted or regulated by the variable transformer VT. The variable transformer VT is connected with the lamp L so as to provide a viewing light circuit, and is manipulatable by a finger piece or knob F so as to vary the light intensity of the lamp L, when the light of the latter is used for producing the negative derived positive picture to be viewed on the monitor or television receiver R. The timer control TC is so connected to the lamp L as to provide a parallel printing light circuit to activate the lamp at full brilliance for a predetermined time as measured by the reaction of said timer control to the ultimate adjustment of the variable transformer VT.

The circuit of the timer control TC operates on the resistance-capacity principle, with a capacitor in series with the cathode circuit of a triode tube. By varying the voltage at the grid of this triode tube, the internal resistance of the tube varies, and thus increases or decreases the timing cycle. The voltage of the capacitor is fed to the grid of a thyratron tube, such as a s 050, which latter tube acts as an electronic switch. When the charge of the capacitor is predetermined and the capacitor discharges, the timing cycle is terminated. In the timing circuit, thus generally characterized, the triode tube functions as a variable resistance, the characteristic curve of which follows that of the temperature rise of the tungsten filament of the lamp L versus the exposure curve of the photographic paper P, when the light intensity of said lamp L is modified by the variable transformer VT to transmit the image of a negative to be printed to the video densitometer for preliminary display as a positive picture on the screen of the monitor or television receiver R.

An understanding of the timer control circuit and its operation can be had by reference to the writing diagram of Fig. 2 and the following description:

110 volt A.C. is applied to the variable transformer indicated by the reference character 10 in Fig. 2, to the power transformer primary 11. The output of the power transformer secondary 12 is fed to a full wave rectifier 13, the output of the latter being supplied to a pi type filter 14. B+ is applied to one set of contacts of switch 15, and in the normally closed position of said switch 15 as shown in Fig. 2 B+ is returned through a 7000 ohm bleeder resistor 16 to ground. When the switch 15 is tripped by the shutter S of the photographic printer, as said shutter is dropped to permit transmission of printing light from lamp L, through a negative N to be printed, to the photographic paper P, B+ is diverted from the bleeder resistor 16, and is thereupon applied to the plate of a thyratron tube 17, to the plate of a triode tube 18, and to the relays K1 and K2.

Switch 15 being in normal initial position as shown in Fig. 2, output of the variable transformer is supplied to the lamp L through relay K1 whereby the lamp can be used as the source of illumination which transmits, by shutter mirror M, the image of a negative N to be printed to the television camera C, and adjustment of the variable transformer 10 will vary the light intensity of the lamp L, so as to produce a positive picture of desired tone and density on the screen of the monitor or television receiver R. The selected voltage thus applied to the lamp L while viewing the positive picture on the monitor or television screen is tapped off and sent through a 1:1 isolation transformer 19, the output of which is rectified by a rectifier 20 and supplied to a voltage doubler 21.

The full output of the voltage doubler 21 is applied to a capacitor 22 through the shorting contacts 28 of relay K1, and is charged to a negative potential. This potential is imposed upon the grid 23 of the thyratron tube 17, so that the latter cannot conduct current to energize the relay K2 until the timing capacitor 22 discharges. The full output of the voltage doubler 21 is also applied across a potentiometer 24, and a part of this voltage is imposed upon the grid 25 of the triode tube 18. This negative potential will vary according to the setting of the light intensity of the lamp L when used to illuminate the video densitometer, and consequently when a positive picture of desired tone and density is displayed on the monitor or television screen, the time is thus automatically set in the circuit of the timer control TC.

The operation sequence of the timing circuit is as follows:

After a desired picture display is obtained on the monitor or television screen, the operator actuates the control switch (not shown) of the photographic printer, whereupon the shutter S is moved to open position and trips switch 15. When switch 15 is tripped, B+ is removed from the bleeder resistor 16 and is applied to the plate circuit of the thyratron tube 17 through the relay K2. At the same time B+ is also applied to the relay K1 through contacts 27 of relay K2, and to the plate circuit of the triode tube 18. Under these circumstances, the relay K1 is energized, and its contacts 28 opened, thereby allowing capacitor 22 to start discharging from the preselected voltage, thus determining the exposure time of the printing lamp L. At the same time, the second set of contacts 29 of relay K1 switch the lamp L from its video densitometer viewing light status to a printing light status under which full 110 volt current is supplied to said lamp L, so that the latter burns at full brilliance.

The lamp L being operative in its printing status, capacitor 22 discharges according to current flow of the triode tube 18 which at that time is conductive. When the capacitor 22 discharges the thyratron tube 17 will conduct and relay K2 will be energized so that the contacts 27 thereof open, and thereby release relay K1. Release of relay K1 through its contacts 29 terminates the printing status of lamp L, and again returns said lamp to viewing status under control of the variable transformer 10 (VT Fig. 1), whereupon the capacitor 22 is shorted through contacts 28 and recharged for an ensuing printing operation of the photographic printer. The photographic printer now completes its printing cycle thereupon closing the shutter S which releases the switch 15, whereupon the printer mechanism advances photographic paper P ready for a next print. The switch 15 being released, B+ is removed from relays K1 and K2, and from tubes 17 and 18, and is returned to the bleeder resistor 16, thus completing a cycle of photographic printer operation ready for a repetition of such cycle.

The control system of this invention is designed for use in connection with the wide latitude photographic paper that is now almost exclusively used in commercial photo-finishing operations, already hereinabove referred to. Since the entire printing operation is performed in connection with paper of one type of emulsion, the various contrast negatives to be printed can be selectively printed merely by changing or modifying the time of exposure thereof to printing light. Therefore, when the video densitometer is once adjusted and set for use in connection with the type of emulsion the paper provides, the resulting image displayed on the screen of the monitor or television receiver R will be correspondingly produced by the printing and developing operation of the printer. All controls on the television camera C, and camera control unit-sync generator G and monitor or television receiver R once adjusted are thereupon locked into position, so that the operator is not thereafter required to alter the same during the operation of the printer with the selected paper.

It will be understood that the control system of this invention is well adapted for use in color printing as well as in black and white printing operations. When the video densitometer is to be used in color printing it is accommodated for such use as follows:

If the control system is to be used in connection with positive type color (e.g. slides), two segmented primary color discs or wheels are inserted in the video densitometer, one in front of the television camera C and the other in front of the monitor or television receiver R. These primary color discs or wheels usually comprise six segments alternating the colors red, blue, and green; said discs or wheels being synchronized so that the colors thereof follow red, to red blue to blue and green to green.

If the control system is to be used in connection with a color negative, two segmented color discs or wheels are employed, one in front of the television camera C comprising complementary colors, and the other in front of the monitor or television receiver R comprising primary colors. These color discs or wheels also generally comprise six segments, and the respective discs or wheels are so synchronized that their respective color segments align as follows:

| Camera disc or wheel | | Monitor disc or wheel |
| --- | --- | --- |
| yellow | to align with | blue. |
| magenta | to align with | green. |
| cyan | to align with | red. |

In this system it is necessary that the color discs or wheels be so respectively arranged and used that when color balance is once established it will not vary.

Since the use of the color discs or wheels in television reproduction is well known to the art, said discs or wheels are not shown.

It will be obvious that the use of the video densitometer, when thus accommodated for color, enables the operator to quickly and easily, by observation of the color picture displayed on the monitor or television receiver screen, judge the picture to be printed as to color as well as to tone and density, so that any desirable color corrections can be made before final printing.

The control system of this invention is of considerable advantage, especially in connection with large scale photographic processing service devoted to developing films and the printing and development of photographs from said films, since the use of the system substantially eliminates necessity for make over operations which involve increased labor and loss of time, while at the same time avoiding loss of material arising from bad prints which must be discarded.

Having now described my invention, I claim:

1. In an exposure control system for a photographic printer having an electric lamp for projecting printing light through a negative to photographic paper, a video densitometer comprising a television camera, a camera control-sync generator and a television receiver, said camera, generator and receiver being in closed circuit connection, a shutter having an open position and a closed position, said shutter being operative in the closed position to intercept light of the lamp transmitted through the negative and including means to reflect the intercepted light to the video densitometer for display of a corresponding entire positive image on the screen of the television receiver, a viewing light circuit including the lamp and a variable transformer manipulatable to vary the intensity of the lamp projected light, whereby to obtain a positive image display on the television receiver screen of selected tone and density, said shutter in the open position permitting light from the electric lamp which passes through the negative to pass on to the photographic paper, a printing light circuit that parallels the viewing light circuit, whereby to activate the lamp for projection of printing light at maximum brilliance, a switch means adapted to be actuated by the shutter, when said shutter is in open position, to open the viewing light circuit and close the printing light circuit, and means cooperative with said printing light circuit to predetermine duration of printing light projection in accordance with selected adjustment of the variable transformer of said viewing light circuit, whereby to produce a positive print from the negative corresponding in tone and density to the positive image obtained on the television screen of the video densitometer.

2. An exposure control system for a photographic printer according to claim 1, wherein the means for predetermining duration of printing light projection comprises a capacitor, a triode tube having its cathode connected in series with said capacitor, means to vary the voltage applied to the grid of said triode tube accordingly as the voltage of the viewing light circuit is varied by the variable transformer of the latter circuit, whereby said triode tube functions as a variable resistance operative to predetermine the discharge rate of the capacitor and thereby increase or decrease the period of printing light projection, a thyratron tube to the grid of which voltage of the capacitor is fed, whereby this thyratron tube functions as an electric switch to interrupt the printing light circuit when the capacitor discharges.

3. An exposure control system for a photographic printer having an electric lamp for projecting printing light through a negative to photographic paper, a video densitometer comprising a television camera, a camera control-sync generator and a television receiver, said camera, generator and receiver being in closed circuit connection, a shutter having an open position and a closed position, said shutter being operative in the closed position to intercept light of the lamp transmitted through the negative and including means to reflect the intercepted light to the video densitometer for display of a corresponding entire positive image on the screen of the television receiver, a viewing light circuit including the lamp and a variable transformer, the latter being manipulatable to vary the intensity of the lamp projected light, whereby to obtain display of a positive image of selected tone and density on the screen of the television receiver, said shutter in the open position permitting light from the electric lamp which passes through the negative to pass on to the photographic paper, a printing light circuit in parallel with the viewing light circuit, relay means operative to switch over from viewing light circuit to printing light circuit, a time control circuit including a capacitor to which charging voltage from the variable transformer of the viewing light circuit is applied accordingly as the voltage of the viewing light circuit is varied by the latter, whereby to time operation of the printing light circuit, when active, to effect maximum lamp brilliance, a triode tube having its cathode connected in series with said capacitor and its grid connected to receive selected voltage determined by the adjustment of the variable transformer of the viewing light circuit, whereby said triode tube functions as a variable resistance characterized to match Kelvin temperature of the lamp filament to the exposure curve of a selected photographic paper and operative to predetermine the discharge rate of the capacitor, a thyratron tube to the plate of which voltage can be applied through the relay means and to the grid of which voltage of the capacitor is fed, whereby said thyratron tube functions as an electronic switch effective through said relay means to interrupt the printing light circuit when the capacitor discharges, and a switch means to control relative operations of the viewing light circuit and the time control and printing light circuits.

4. An exposure control system for a photographic printer according to claim 3, wherein the switch means to control the viewing light circuit and the time control and printing light circuits cooperates with the shutter, whereby in the closed position of said shutter to set said switch means to close the viewing light circuit and in the open position of said shutter to set said switch means to open the viewing light circuit and close the time control circuit thereby in turn to close the printing light circuit for projection of printing light at maximum brilliance during a time interval predetermined by operation of said time control circuit.

5. In a photographic printer having an electric lamp for projecting printing light through a negative to photographic paper and including a video densitometer operative to convert, by viewing light emitted by said lamp, the entire negative image to a visible corresponding entire positive image, and a shutter having an open position and a closed position and operative in the closed position to intercept viewing light of the lamp transmitted through the negative, said shutter including means to reflect viewing light intercepted while in the closed position to the video densitometer, said shutter being operative when in the open position to permit light from the electric lamp which passes through the negative to pass on to the photographic paper, a viewing light circuit controlling the lamp including a variable transformer manipulatable to vary the intensity of the viewing light emitted by the lamp to the video densitometer, whereby to obtain by the latter a positive image display of selected tone and density, a printing light circuit parallel to the viewing light circuit, whereby to actuate the lamp for emission of printing light at maximum brilliance, a switch means adapted to be actuated by the shutter, when said shutter is positioned to pass printing light, whereby to interrupt the viewing light circuit and close the printing light circuit, and means cooperative with said printing light circuit operative to predetermine duration of printing light projection by the lamp in accordance with selected adjustment of the variable transformer of the viewing light circuit, whereby to produce a positive print from the negative corresponding in tone and density to the positive image obtained by the video densitometer.

6. In a photographic printer according to claim 5, wherein the means for predetermining duration of the printing light projection comprises a capacitor, a triode tube having its cathode connected in series with said capacitor, means to vary the voltage applied to the grid of said triode tube accordingly as the voltage of the viewing light circuit is varied by the variable transformer of the latter circuit, whereby said triode tube functions as a variable resistance operative to prdetermine the discharge rate of the capacitor and thereby increase or decrease the period of printing light projection, a thyratron tube to the grid of which voltage of the capacitor is fed, whereby this thyratron tube functions as an electric switch to interrupt the printing light circuit when the capacitor discharges.

7. In a photographic printer having an electric lamp for projecting printing light through a negative to photographic paper and including a video densitometer operative to convert, by viewing light emitted by said lamp, the entire negative image to a visible corresponding entire positive image, and a shutter having an open position and a closed position and operative in the closed position to intercept viewing light of the lamp transmitted through the negative, said shutter including means to reflect viewing light intercepted while in the closed position to the video densitometer, said shutter being operative when in the open position to permit light from the electric lamp which passes through the negative to pass on to the photographic paper, a viewing light circuit controlling the lamp including a variable transformer manipulatable to vary the intensity of the viewing light emitted by the lamp to the video densitometer, whereby to obtain by the latter a positive image display of selected tone and density, a printing light circuit in parallel with the viewing light circuit, relay means operative to switch over from viewing light circuit to printing light circuit, a time control circuit including a capacitor to which charging voltage from the variable transformer of the viewing light circuit is applied accordingly as the voltage of the viewing light circuit is varied by the latter, whereby to time operation of the printing light circuit, when active, to effect maximum lamp brilliance, a triode tube having its cathode connected in series with said capacitor and its grid connected to receive selected voltage determined by the adjustment of the variable transformer of the viewing light circuit, whereby said triode tube functions as a variable resistance characterized to match Kelvin temperature of the lamp filament to the exposure curve of a selected photographic paper and operative to predetermine the discharge rate of the capacitor, a thyratron tube to the plate of which voltage can be applied through the relay means and to the grid of which voltage of the capacitor is fed, whereby said thyratron tube functions as an electronic switch effective through said relay means to interrupt the printing light circuit when the capacitor discharges, and a switch means to control relative operations of the viewing light circuit and the time ocntrol and printing light circuits.

8. In a photographic printer according to claim 7, wherein the switch means to control the viewing light circuit and the time control and printing light circuits cooperates with said shutter, whereby in the closed position of said shutter to set said switch means to close the viewing light circuit and in the open position of said shutter to set the switch means to interrupt the viewing light circuit and close the time control circuit thereby in turn to close the printing light circuit for projection of printing light at maximum brilliance during a time interval predetermined by the operation of said time control circuit.

References Cited in the file of this patent

UNITED STATES PATENTS

| 1,894,004 | Rose | Jan. 10, 1933 |
| 2,480,425 | Simmon | Aug. 30, 1949 |
| 2,501,446 | Justice | Mar. 21, 1950 |
| 2,698,356 | Roos | Dec. 28, 1954 |
| 2,709,391 | Reeves | May 31, 1955 |

OTHER REFERENCES

Scott text: "Flying Spot Pattern Generator," March 1957, in "Radio-Electronics," pages 65 and 80.